United States Patent
Buwalda et al.

(10) Patent No.: US 7,157,573 B2
(45) Date of Patent: Jan. 2, 2007

(54) HYDROPHOBIC STARCH DERIVATIVES

(75) Inventors: Pieter Lykle Buwalda, Groningen (NL); Ronald Peter W. Kesselmans, Annen (NL); Augustinus Arnoldus M. Maas, Haren (NL); Hylke Hotze Simonides, Groningen (NL)

(73) Assignee: Cooperatie Avebe U.A., Veendam (NL)

( * ) Notice: Subject to any disclaimer, the term of this patent is extended or adjusted under 35 U.S.C. 154(b) by 0 days.

(21) Appl. No.: 11/205,721

(22) Filed: Aug. 17, 2005

(65) Prior Publication Data

US 2005/0277768 A1 Dec. 15, 2005

Related U.S. Application Data

(63) Continuation of application No. 09/869,410, filed as application No. PCT/NL00/00018 on Aug. 31, 2001, now abandoned.

(30) Foreign Application Priority Data

Jan. 15, 1999 (EP) .................. 99200111

(51) Int. Cl.
| | |
|---|---|
| C08B 31/02 | (2006.01) |
| C08B 33/02 | (2006.01) |
| C08B 35/02 | (2006.01) |
| C08B 31/00 | (2006.01) |
| C08B 33/00 | (2006.01) |
| C08B 35/00 | (2006.01) |

(52) U.S. Cl. ............... 536/107; 536/102; 536/105; 536/106; 536/108; 536/111; 536/115; 536/120; 536/124

(58) Field of Classification Search ............... 536/102, 536/105, 106, 107, 108, 111, 115, 120, 124
See application file for complete search history.

(56) References Cited

FOREIGN PATENT DOCUMENTS

| | | |
|---|---|---|
| EP | 0 761 691 A2 | 3/1997 |
| EP | 0 799 837 A2 | 10/1997 |
| EP | 0 824 161 A2 | 2/1998 |
| WO | WO 97/03120 * | 1/1997 |

OTHER PUBLICATIONS

Fredriksson et al. Carbohydrate Polymers (1998), vol. 35, pp. 119-133.*

* cited by examiner

*Primary Examiner*—Patrick Lewis
(74) *Attorney, Agent, or Firm*—Hoffmann & Baron, LLP

(57) ABSTRACT

The invention relates to a process for preparing a hydrophobic starch, comprising etherification, esterification or amidation of a root or tuber starch comprising at least 95 wt. % of amylopectin, based on dry substance of the starch, or a derivative thereof, with a substituent comprising an alkyl chain having from 4–24 carbon atoms. The invention further relates to a hydrophobic starch obtainable by said process.

10 Claims, No Drawings

HYDROPHOBIC STARCH DERIVATIVES

This application is a continuation of U.S. application Ser. No.: 09/869,410 filed Aug. 31, 2001, now abandoned which is a §371 national stage application of international PCT Application No. PCT/NL00/00018 (WO 00/42076), filed Jan. 13, 2000. This application asserts priority to European Patent Application Serial No. 99200111.5 filed on Jan. 15, 1999. The specifications of U.S. application Ser. No. 09/869,410, PCT/NL00/00018 and European Patent Application Serial No. 99200111.5 are hereby incorporated by reference.

BACKGROUND OF THE INVENTION

The invention relates to a process for preparing a derivative of starch of a hydrophobic nature, as well as to a derivative obtainable in said process.

Hydrophobically modified biopolymers, such as pclysaccharides, find application in, inter alia, the textile and paper industries, in personal care products, bioplastics, water-based coatings, adhesives and inks. When dissolved or dispersed in water, these compounds possess favorable foaming and surface tension properties. Further, such compounds provide enhanced viscosification of aqueous solutions or dispersions containing the compounds.

It is believed that viscosity enhancement from increased hydrophobe content of such solutions or dispersions may be due to intermolecular association of individual polysaccharide molecules through the presence of hydrophobic groups or molecules to form polymeric networks. Support for this association has been observed in the rheology of the solutions. At relatively low shear rates up to 12 reciprocal secs, the solutions exhibit only mild pseudoplasticity at higher viscosities and near Newtonian behavior at lower viscosities. However, at shear rates of 200 reciprocal secs, the viscosity drops to very low values. This non-linear shear thinning behavior is consistent with the formation of intermolecular bridges by the presence of hydrophobic groups or molecules. Introduction of charged groups, which has conventionally been used for viscosity enhancement, has a number of disadvantages, such as sensitivity to the presence of salts. For instance, increased cationic substitution by quaternary nitrogen substituents which do not contain hydrophobic groups or molecules, causes a reduction in the solution viscosity at a constant high shear. It is believed that the increased cationic repulsion between molecules inhibits the formation of hydrophobe bridging resulting in a breakdown in the polymer network in solution.

Hydrophobically modified polymers, where the backbone is a cellulosic polymer, have been shown to possess an associative behavior. However, no associative behavior has been observed when the backbone is formed by starch. Järnström et al., in Nordic Pulp and Paper, Research journal, no. 3/1995, pp. 183–189, have described five different modified starches, of which three were hydrophobically modified by reaction with octenyl substituted succinic anhydride. They have observed that in relative concentrated solutions of these three hydrophobic starches, no associative behavior occurs.

The present invention aims to provide a hydrophobic starch which does show associative behavior. It is further an object of the invention to provide a hydrophobic starch which may be formed into a reversible gel. Yet another object of the invention is to provide a hydrophobic starch having excellent rheology regulating properties, such as a high viscosity when dissolved or dispersed in water.

SUMMARY OF THE INVENTION

It has been found that the above goals can be achieved by using a specific type of starch as the basis for the hydrophobic starch. Thus, the invention relates to a process for preparing a hydrophobic starch, comprising etherification, esterification or amidation of a root or tuber starch comprising at least 95 wt. % of amylopectin, based on dry substance of the starch, or a derivative thereof, with a substituent comprising an alkyl chain having from 4–24 carbon atoms.

A process according to the invention leads in a highly convenient manner to the objective hydrophobic starch. The hydrophobic starch obtainable by said process has been found to show associative behavior. This associative behavior leads to a viscosity enhancement of the hydrophobic starch in solution, and may even lead to the formation of gels. As opposed to viscosity enhancement due to the introduction of charged groups, viscosity enhancement resulting from hydrophobic interaction shows a slight increase in the presence of salts. Further, the hydrophobically modified starch has an increased surf ace activity in comparison with non-modified starch.

Without wishing to be bound by theory, it is believed that associative behavior of the present hydrophobically modified starch in aqueous solutions occurs through interaction of the hydrophobic alkyl groups attached to the starch molecules. Hydrophobic groups of ten tend to cluster into aggregates, such as micelles or vesicles. The driving force for this cluster formation is believed to arise from the tendency of the hydrophobic groups to minimize the disruption of the water structure around the starch. Associating between hydrophobic alkyl groups may occur between alkyl chains having a certain minimum chain length. If the alkyl chain is too short, the chains attached to the polymer molecules cannot come close enough to each other to interact. Furthermore, the degree of substitution of the alkyl groups has to exceed a certain critical limit to give noticeable interaction.

The product obtainable by said process has excellent properties, making it an extremely suitable rheology regulating agent. It has been observed, for instance, that when a solution of a hydrophobic starch according to the invention having a viscosity of 200 mPa·s is added to a solution of native starch or starch derivative, also having a viscosity of approximately 200 mPa·s, an enormous increase in viscosity takes place. Also, the present hydrophobic starch is highly suitable to be used as an emulsifying agent, and as such has a stabilizing effect on an emulsion. In addition, the product may be formulated into a reversible gel. Furthermore, the hydrophobic starch provides a better spread on low energy surfaces. As a result, the hydrophobic starch has very good adhesion properties on these low energy surfaces.

DETAILED DESCRIPTION OF THE INVENTION

As has been indicated above, in a process according to the invention, a starch is used, which starch has a very high amylopectin content. Most starch types consist of granules in which two types of glucose polymers are present. These are amylose (15–35 wt. % on dry substance) and amylopectin (65–85 wt. % on dry substance). Amylose consists of unbranched or slightly branched molecules having an average degree of polymerization of 1000 to 5000, depending on the starch type. Amylopectin consists of very large, highly branched molecules having an average degree of polymerization of 1,000,000 or more. The commercially most important starch types (maize starch, potato starch, wheat starch and tapioca starch) contain 15 to 30 wt. % amylose.

Of some cereal types, such as barley, maize, millet, wheat, milo, rice and sorghum, there are varieties of which the starch granules nearly completely consist of amylopectin. Calculated as weight percent on dry substance, these starch granules contain more than 95%, and usually more than 98% amylopectin. The amylose content of these cereal starch granules is thus less than 5%, and usually less than 2%. The above cereal varieties are also referred to as waxy cereal grains, and the amylopectin starch granules isolated therefrom as waxy cereal starches.

In contrast to the situation of different cereals, root and tuber varieties of which the starch granules nearly exclusively consist of amylopectin are not known in nature. For instance, potato starch granules isolated from potato tubers usually contain about 20% amylose and 80% amylopectin (wt. % on dry substance). During the past 10 years, however, successful efforts have been made to cultivate by genetic modification potato plants which, in the potato tubers, form starch granules consisting for more than 95 wt. % (on dry substance) of amylopectin. It has even been found feasible to produce potato tubers comprising substantially only amylopectin.

In the formation of starch granules, different enzymes are catalytically active. Of these enzymes, the granule-bound starch synthase (GBSS) is involved in the formation of amylose. The presence of the GBSS enzyme depends on the activity of genes encoding for said GBSS enzyme. Elimination or inhibition of the expression of these specific genes results in the production of the GBSS enzyme being prevented or limited. The elimination of these genes can be realized by genetic modification of potato plant material or by recessive mutation. An example thereof is the amylose-free mutant of the potato (amf) of which the starch substantially only contains amylopectin through a recessive mutation in the GBSS gene. This mutation technique is described in, inter alia, J. H. M. Hovenkamp-Hermelink et al., "Isolation of amylose-free starch mutant of the potato (*Solanum tuberosum* L.)", Theor. Appl. Gent., (1987), 75:217–221, and E. Jacobsen et al., "Introduction of an amylose-free (amf) mutant into breeding of cultivated potato, *Solanum tuberosum* L., Euphytica, (1991), 53:247–253.

Elimination or inhibition of the expression of the GBSS gene in the potato is also possible by using so-called antisense inhibition. This genetic modification of the potato is described in R. G. F. Visser et al., "Inhibition of the expression of the gene for granule-bound starch synthase in potato by antisense constructs", Mol. Gen. Genet., (1991), 225:289–296.

By using genetic modification, it has been found possible to cultivate and breed roots and tubers, for instance potato, yam, or cassava (Patent South Africa 97/4383), of which the starch granules contain little or no amylose. As referred to herein, amylopectin potato starch is the potato starch granules isolated from potato tubers and having an amylopectin content of at least 95 wt. % based on dry substance.

Regarding production possibilities and properties, there are significant differences between amylopectin potato starch on the one hand, and the waxy cereal starches on the other hand. This particularly applies to waxy maize starch, which is commercially by far the most important waxy cereal starch. The cultivation of waxy maize, suitable for the production of waxy maize starch is not commercially feasible in countries having a cold or temperate climate, such as The Netherlands, Belgium, England, Germany, Poland, Sweden and Denmark. The climate in these countries, however, is suitable for the cultivation of potatoes. Tapioca starch, obtained from cassave, may be produced in countries having a warm climate, such as is found in regions of South East Asia and South America.

The composition and properties of root and tuber starch, such as amylopectin potato starch and amylopectin tapioca starch, differ from those of the waxy cereal starches. Amylopectin potato starch has a much lower content of lipids and proteins than the waxy cereal starches. Problems regarding odor and foaming, which, because of the lipids and/or proteins, may occur when using waxy cereal starch products (native and modified), do not occur, or occur to a much lesser degree when using corresponding amylopectin potato starch products.

According to the present invention, the amylopectin starch to be used is a root or tuber starch. It has been found that the presence of the lipids and proteins adversely affects the hydrophobation reaction, leading to by-products because of which the hydrophobic starch is not of sufficient quality. Moreover, hydrophobic starch based on an amylopectin root or tuber starch has been found to show highly favorable hydrophobic behavior.

The use of amylopectin potato starch and amylopectin tapioca starch has been found to lead to particularly advantageous hydrophobic starches.

In a preferred embodiment, a derivative of a starch type as described above is used. Especially, derivatives obtainable by hydroxyethylation, hydroxypropylation, carboxymethylation, cationization, degradation, hydrolysis (possibly enzymatic), oxidation or a combination thereof, are useful. The use of a suitable derivative leads to a hydrophobic starch having an improved reactivity, stability, solubility, complexation, enzyme resistance and/or other properties. Particularly, hydroxypropylation has been found to have a beneficial effect on the stability of the resulting hydrophobic starch. It is also possible to perform the hydrophobation first, and then prepare a suitable derivative by hydroxyethylation, hydroxypropylation, carboxymethylation, cationization, degradation and/or oxidation to improve the stability, solubility, complexation, enzyme resistance, and other properties of a product obtainable by a process according to the invention. The amount of additional substitution, i.e. molar substitution defined as the average moles of such substituent per mole of glucose units, designated MS, is not critical but may be any amount desired, depending on the envisaged application of the product.

The molecular weight of the starch used for preparing a hydrophobic starch according to the invention is an important factor in controlling the viscosity and rheological properties of the hydrophobic starch to be prepared. Preferably, the molecular weight of the starch is decreased before, during or after the hydrophobation reaction. A decrease in molecular weight may be accomplished by oxidation or degradation, e.g. by a reaction of the starch with sodium hypochlorite, hydrogen peroxide, ozone, an acid, or the like. In a preferred embodiment, the starch is first degraded or oxidized and then a hydrophobic group is introduced. It is within the skill of the artisan to determine the extent of oxidation or degradation desirable for a certain envisaged application of the hydrophobic starch.

In a process according to the invention, a hydrophobic substituent is attached to the specific starch described above by an ether, ester or amide group. When the hydrophobic group is attached to the starch via an ether linkage, the hydrophobic reagent preferably comprises a halide, halohydrin, epoxide or glycidyl group as reactive site. The alkyl chain of the agent can vary from 4–24 carbon atoms, preferably from 7–20 carbon atoms. Suitable examples of hydrophobic reagents to provide an ether linkage are cetyl bromide, lauryl bromide, butylene oxide, epoxidized soybean fatty alcohols, epoxydized linseed fatty alcohols, allyl glycidyl ether, propyl glycidyl ether, butyl glycidyl ether, decane glycidyl ether, lauryl glycidyl ether, lauryl phenyl glycidyl ether, myristoyl glycidyl ether, cetyl glycidyl ether, palmityl glycidyl ether, stearyl glycidyl ether, linolyl glycidyl ether and mixtures thereof. Other etherification agents which may be used to react with starch in accordance with the invention are alkyl halides containing at least four carbon atoms, such as 1-bromodecane, 10-bromo-1-decanol, and 1-bromododecane.

In a preferred embodiment a charged hydrophobic group is introduced. A hydrophobic cationic group can be attached via an ether linkage by reaction of the starch with a reagent comprising a quaternary ammonium group, for example a 1-chloro-2-hydroxypropyltrialkyl ammonium salt or a glycidyltrialkyl ammonium salt. The alkyl chains of this quaternary ammonium group can vary from 1–24 carbon atoms, preferably from 7–20 carbon atoms, wherein at least one of the alkyl chains of the quaternary ammonium group comprises 4–24 carbon atoms. Preferably, the other alkyl chains have less than 7 carbon atoms. For example 1-chloro-2-hydroxypropyldimethyllauryl ammonium salt, 1-chloro-2-hydroxypropyldimethylmyristoyl ammonium salt, 1-chloro-2-hydroxypropyldimethylcetyl, 1-chloro-2-hydroxypropyldimethylstearyl, glycidyldimethyllauryl ammonium salt, glycidyldimethylmyristoyl ammonium salt, glycidyldimethylcetyl ammonium salt, glycidyldimethylstearyl ammonium salt, dialkylaminoethyl halide, or mixtures of the above can be applied as hydrophobic cationization reagent. A hydrophobic cationic group may be introduced by reaction with tertiary ammonium groups such as chloroethyldialkylamine hydrogen chloride salt. The alkyl chain of this tertiary ammonium group may vary from 1 to 24 carbon atoms. The reaction for introducing the hydrophobic cationic group may be performed analogous to the procedure disclosed in EP-A-0 189 935. A hydrophobic anionic group can be attached applying a 2-chloro-amino-dialkyl acid as reagent, for instance analogous to the procedure disclosed in EP-A-0 689 829.

When the hydrophobic group is attached to the starch via an ester linkage, several kinds of reagents, such as alkyl anhydrides can be applied. The alkyl chain can vary from 4–24 carbons, preferably from 7–20 carbons. Especially, mixed anhydrides as octanoic acetic anhydride, decanoic acetic anhydride, lauroyl acetic anhydride, myristoyl acetic anhydride are suitable alkyl anhydrides.

In a preferred embodiment, hydrophobic anionic groups may be attached to the amylopectin starch. This may be accomplished by reaction of the specific starch with an alkyl succinic anhydride or alkenyl succinic anhydride. The alkyl chain can vary from 4–24 carbons, preferably from 7–20 carbons. Octenyl succinic anhydride, nonyl succinic anhydride, decyl succinic anhydride, dodecenyl succinic anhydride are most commonly applied. The procedure in accordance with this embodiment may be performed analogous to the procedures disclosed in U.S. Pat. No. 5,776,476.

For the preparation of a hydrophobic group linked to carboxymethyl amylopectin starch by an amide group the procedure as described in WO-A-94/24169 can analogously be applied. Examples of suitable reagents for introduction of an amide group include fatty amines comprising saturated or unsaturated hydrocarbon groups having from 8 to 30 carbon atoms. Branched hydrocarbon groups are not excluded, but linear chains are preferred. Preferably, the fatty radical originates from a $C_{12}$ to $C_{24}$ fatty amine. Particularly favorable results are obtained if the fatty amine is selected from the group consisting of n-dodecylamine, n-hexadecylamine, n-octadecylamine, cocoamine, tallowamine, hydrogenated N-tallow-1,3-diaminopropane, N-hydrogenated tallow-1,3-diaminopropane, and N-oleyl-1,3-diaminopropane. Such fatty amines are known under the trade names Armeen and Duomeen (AKZO Chemicals).

The degree of hydrophobic substitution, i.e. DS, defined as the average number of moles of hydrophobic substituents per mole glucose units, achieved in a process according to the invention, may vary depending upon the presence of other substituents in the starch prior to the hydrophobation, the type of hydrophobic reagent used, and the envisage application of the product. Generally, the DS will be greater than zero, preferably from 0.0001 to about 0.4, more preferably from 0.001 to 0.2, and most preferably from 0.002 to 0.1. It is surprising to note that even a very small DS leads to a relatively large effect.

The hydrophobation of amylopectin root or tuber starch may be performed under semi-dry reaction conditions, in suspension (water or organic solvent), in aqueous solution (dispersion), or during the gelatinization of the amylopectin potato starch granules. It is also possible to perform the hydrophobation in an extruder at increased temperature and pressure. According to the latter embodiment, it is possible to perform the reaction continuously. The moisture content is preferably smaller than 25% when the reaction is carried out in an extruder.

Preferably, water is used as a solvent when the reaction is performed in suspension. When the hydrophobic reagent has a low solubility in water, combinations of water and suitable water mixable organic solvents may be employed. Suitable organic solvents include, but are not limited to, methanol, ethanol, i-propanol, n-propanol, t-butanol, sec-butanol, methylethylketon, tetrahydrofuran, dioxan, and acetone.

The reaction in aqueous solution is preferably performed using a reaction mixture comprising more than 20 wt. % of the starch or derivative thereof and less than 80 wt. % of the solvent. More preferably, the starch content in the reaction mixture lies between 20 and 40 wt. %, whereas the solvent content preferably lies between 80 and 60 wt. %. An autoclave in combination with a dryer (drum dryer; spray dryer) or an extruder is preferably used as a reaction vessel. The reaction is further performed under conditions which are well-known for analogous reactions. The pH lies preferably between 7 and 13.

Preferably, a process according to the invention is performed in the presence of a caustic catalyst, such as an alkali metal hydroxide or the like material. In accordance with specific embodiments, the caustic catalyst is used in such amounts that it is in fact present as a reagent.

Further, it has been found that the reaction for preparing a hydrophobic starch according to the invention can be accelerated by the presence of one or more surfactants in the reaction mixture. Suitable surfactants are characterized by the ability to facilitate bringing the hydrophobic reagent in contact with the hydrophilic starch, so reaction can take place (phase-transfer catalysis). In accordance with this embodiment, the reaction is preferably performed while the reaction mixture is stirred. Surfactants can be applied in any of the above mentioned reaction systems. The surfactants which may be used include nonionics, anionics, cationics or amphoterics, singly or in combination provided they are compatible with the other components of the reaction system and they are capable to facilitate bringing the hydrophobic reagent in contact with the hydrophilic starch. Examples of suitable surfactants are higher fatty alcohol sulfates, such as a sodium or potassium sulfate of an alcohol having from 8 to 18 carbon atoms, alkylphenoxypolyethoxyethanols, such as octylphenoxypolyethoxyethanols, alkyltrimethylammonium halides and alkyltributylammonium hydroxides, such as tetramethylammonium hydroxide and cetyltrimethylammonium bromide, alkyl acids, such as stearic acid, an ethylene oxide condensate of a long-chain alcohol, such as lauryl, or cetyl alcohol, polyoxyethylene sorbitan stearate, and many others. Preferably, the surfactant comprises a branched alkyl chain or multiple alkyl chains. The amounts wherein the surfactants are used may vary between 0.1 and 10 wt., based on dry substance of starch.

As has been mentioned above, it is one of the great advantages of the invention, that a product obtainable by a process as disclosed herein above, may be used to form a reversible gel.

A hydrophobic starch obtainable in a process as disclosed above may be used in the paper industry, for instance in surface sizing or coatings, or in the textile industry, for instance as textile warp size. In addition, the present product may find application in personal care products, for instance for the retention of oils; perfumes, emollients and the like; in hair and skin care compositions including water-in-oil or oil-in-water emulsions, lotions, detergents, creams, soaps, cleansers, sunscreens, shampoos, rinses, conditioners, anti-dandruff aids. Further, the product may be applied as carrier for active agents in, for example, internal drugs (controlled release), in dispersants, as flow control aids in flocculants, as thickeners, in antistatic softeners, or as topically active agents to various substrates such as metal, glass and so on. The product may further be used in various food products, such as noodles, emulsifying agents, e.g. beverage emulsifiers, low fat products, spreads, sauces, dressings, batters, and dry seasoning mixes. Other applications include the use of the product in bioplastics, water-based coatings, adhesives and inks, such as employed in ink-jet recording sheets.

The invention will now be elucidated by the following non-restrictive examples.

EXAMPLES

Methods

Determination of the Degree of Substitution of an Alkylsuccinic Ester by Saponification The degree of substitution (DS) is defined as the amount of ester in mole per mole of glucose units. The degree of substitution of alkylsuccinic esters is measured according to the following procedure.

Approximately 10 g (dry substance) product and 10 mL methanol are mixed. The mixture is poured into 50 mL water. The suspension is stirred and some drops of a phenolphthalein solution in 50 weight % ethanol are added. The suspension is titrated with a 0.1 N aqueous NaOH solution to light red. Then 25.00 mL of 0.1 N aqueous NaOH solution is added. The mixture is stirred at 40° C. during 24 hours and then the mixture is cooled to room temperature and titrated to colorless with 0.1 N aqueous HCl solution. Beside, the ester substituted products also a non-substituted product is measured as control. The DS is calculated with the formula:

$$DS=(162+0.1\times(25.00-A))/(B-(Y+0.1\times(25.00-A))),$$

wherein

A=mL 0.1 N HCl of the product—mL 0.1 N HCl of the control

B=mg product (dry substance)

Y=210 if substituent is octenylsuccinic ester

Y=266 if substituent is dodecenylsuccinic ester or tetrapropenylsuccinic anhydride Brabender Viscosity To characterize starch and starch derivatives, a Brabender viscograph is generally used to record a viscosity curve, the viscosity is expressed in Brabender units (BU).

In this case the heating and cooling step is 1.5° C. per minute, rotation 75 rpm, torque 250 cmg and the concentration 3%.

The suspension is heated from room temperature to 90° C. and kept at that temperature for 20 min. Thereafter, the dispersion is cooled to 30° C.

In the tables shown below, the viscosity after 20 minute at 90° ($BU_{90\text{-}20}$) and the viscosity after cooling to 30° C. are given.

Brookfield Viscosity

A suspension of 2 weight % of starch in demineralized water is heated at 90° C. under stirring for 20 minutes. The resulting dispersion is cooled to 20° C. and the Brookfield viscosity is measured with a Brookfield RVF viscometer (20 rpm; spindle 4).

After the determination of the viscosity the starch dispersion was sheared for 1 minute with an Ultra-Turrax T50 at 10.000 rpm. After 2 hours the Brookfield viscosity after shear was measured at 20° C.

Example 1

The Preparation of an Octenylsuccinic Ester of Starch

A suspension of 5 mole starch in water (39% dry matter) was prepared. The suspension was stirred at 25° C. and the pH was adjusted to 8.5 by the addition of an aqueous 4.4 wt. % NaOH solution. To the suspension the octenylsuccinic anhydride was added slowly in an amount sufficient to obtain the desired DS. During addition the pH of the reaction mixture was kept constant at 8.5.

After 4 hours reaction the reaction mixture was neutralized to pH 5.0. Subsequently, the crude product was filtered over a Büchner funnel, washed with 5 L water, and suspended in 2 L methanol. This suspension was stirred for 1 hour at room temperature and the product again was filtered over a Büchner funnel. The starch ester was washed with 5 L water and dried at room temperature.

The type of starch (potato starch, amylopectin potato starch or waxy maize starch) and the degree of substitution was varied (Dsmax 0.02, 0.03 or 0.04). The Brabender viscosities of the products were measures. The results are shown in Table 1.

Example 2

The Preparation of a Dodecenylsuccinic Ester or Tetraprovenylsuccinic Ester of Starch A suspension of 5 mole starch in water (39% dry matter) was prepared. The suspension was stirred at 25° C. and the pH was adjusted to 8.5 by the addition of an aqueous 4.4 w/w % NaOH solution. To the suspension the alkylsuccinic anhydride was added slowly in an amount to obtain the desired DS. During addition the pH of the reaction mixture was kept constant at 8.5. After 23 hours reaction the reaction mixture was neutralized to pH 5.0. Subsequently, the crude product was filtered over a Buchner funnel, washed with 5 L water, and suspended in 2 L methanol. This suspension was stirred for 1 hour at room temperature and the product again was filtered over a Büchner funnel. The starch ester was washed with 5 L water and dried at room temperature.

The type of starch (potato starch, amylopectin potato starch or waxy maize starch), the reagent (dodecenylsuccinic anhydride or tetrapropenylsuccinic anhydride, 0.05 mole). The Brabender viscosities of the resulting products are shown in Table 1.

TABLE 1

Brabender viscosity of the different alkylsuccinic esters of different starch types

| Type of starch | Alkylsuccinic ester | DS (mole/mole) | Brabender viscosity (BU) at 20'90 | at 30° C. |
|---|---|---|---|---|
| potato | Octenylsuccinic | 0.015 | 960 | 1690 |
|  | Dodecenylsuccinic | 0.008 | 860 | 1550 |
| Amylopectin potato | none | none | 700 | 960 |
|  | Octenylsuccinic | 0.013 | 2040 | 2370 |
|  |  | 0.019 | 2380 | 2830 |
|  |  | 0.023 | 2580 | 3000 |
|  | Dodecenylsuccinic | 0.005 | 1400 | 3220 |
|  | Tetrapropenylsuccinic | 0.016 | 2090 | 2720 |
| Waxy maize | Octenylsuccinic | 0.017 | 1320 | 1520 |
|  | Dodecenylsuccinic | 0.005 | 290 | 560 |
|  | Tetrapropenylsuccinic | 0.016 | 1210 | 1660 |

Example 3

The Preparation of Amylopectin Potato Starch has Increased Brabender Viscosity in a Lauryl Cationic Starch Ether A suspension of 2.5 mole starch in water (39% dry matter) was prepared. The suspension was stirred at 35° C. To the suspension the X mole 1-chloro-2-hydroxypropyl-dimethyllauryl ammonium chloride was added. Subsequently, (X+0.125) mole NaOH was added as an aqueous 4.4 w/w % NaOH solution over a period of 1 h.

After 24 hours reaction the reaction mixture was neutralized to pH 5.0 with hydrochloric acid, washed with 2.5 L water and dried at room temperature.

The type of starch (potato starch, amylopectin potato starch or waxy maize starch) and the degree of substitution (DS) was varied. The Brookfield viscosity of the products were measured as indicated above. The results are summarized in Table 2.

As can be seen in the table the Brookfield viscosity of solutions of the hydrophobic amylopectin starch before and after high shear is much higher in comparison to the viscosity of the derivatives based on potato and waxy maize starch. Note the hydrophobic amylopectin potato starch derivatives are less sensitive towards the high shear treatment.

TABLE 2

Brookfield viscosity (before and after high shear) of the lauryl cationic ethers of different types of starch

| Type of starch | DS (mole/mole) | Brookfield viscosity (mPa · s.) before shear | after shear |
|---|---|---|---|
| Potato | 0.04 | 5650 | 745 |
| Amylopectin potato | 0.04 | 14800 | 2080 |

TABLE 2-continued

Brookfield viscosity (before and after high shear) of the lauryl cationic ethers of different types of starch

| Type of starch | DS (mole/mole) | Brookfield viscosity (mPa · s.) before shear | after shear |
|---|---|---|---|
|  | 0.06 | 14400 | 3290 |
| Waxy Maize | 0.06 | 4200 | 255 |

Example 4

The Preparation of a Hydroxyalkyl Ether of Starch

A mixture of 2.5 mole starch and 5 g NaOH was suspended in 500 mL isopropyl alcohol. To the suspension was added 500 mL of demineralized water and the reaction mixture was heated to 70° C. To the mixture 250 mmol glycidyllauryl ether was added.

After 4 days stirring the reaction mixture was cooled to room temperature, neutralized with 6 N HCl, filtered over a Büchner funnel, washed successively with 2.5 L water and 0.5 L ethanol, and dried at room temperature.

During reaction some samples were taken to determine the epoxide content. This content was measured according to the next procedure.

The total weight of the reaction suspension was measured. A sample of 5.00 g of the suspension was taken. This sample is filtered over a G4 filter and washed successively with 50 mL of water and 50 mL of ethanol. The filtrate was brought in an Erlenmeyer. The temperature of the solution was raised to 75° C. and a few drops of an aqueous Thymol Bleu solution (0.04 weight %) was added. The mixture was titrated with HCl till the color turned yellow and then 25.0 mL of a sodium thiosulfate solution in water (30 weight %) was added. After 30 minutes the raised pH was titrated with 0.1 N HCl solution until the bleu solution colored yellow. The epoxide content and the yield of the reaction were calculated according to the formulas:

Epoxide content (mmol)=(mL 0.1 N HCl)×0.1×A wherein
   A=(Total weight of the suspension)/5.00
Yield (%)=(Epoxide content)/250×100%

TABLE 3

| Reaction after . . . days | Yield |
|---|---|
| 0 | 87% |
| 2 | 47% |
| 4 | 23% |

Example 5

The Preparation of a Hydroxyalkyl Ether of Hydroxy-Propyl Starch

To an alkaline solution (pH>12) of 7.5 mole of hydroxypropylated amylopectin potato starch (DSmax=3.0) in 1.7 L water stirred at 80° C. were added 375 mmoles of glycidyllauryl ether. The reaction was stirred for another 4.5 h at 80° C., and allowed to come to room temperature.

During the reaction, some samples were taken to determine the epoxide content as discussed in example 4. Of the reaction mixture, 20 g was dissolved in 80 mL water and 50 mL ethanol was added. The mixture was heated to 75° C.

The epoxide content and the yield of the reaction was determined according to the procedure described in example 4.

TABLE 4

Yield

| Reaction after . . . hours | Yield |
|---|---|
| ½ | 87% |
| 2 | 68% |
| 4½ | 46% |

Example 6

Adhesive Performance

The adhesive performance of hydrophobized amylopectin potato starch was determined in comparison to non-hydrophobized amylopectin potato starch. As test material octenylsuccinic ester of hypochlorite oxidized amylopectin potato starch was used. These octenylsuccinic ester (DSmax 0.02) was prepared from hypochlorite oxidized amylopectine potato starch according to the procedure described in example 1.

Preparation of an Adhesive Composition

The octenylsuccinic esters of amylopectin potato starch was intensively mixed with demineralized water at room temperature. The pulverized starch derivative was poured in the water under continuously stirring, the applied mass ratio starch:water=1:4, respectively, yielding a solution with a solid content of approximately 20%. The prepared adhesive was evaluated for practical adhesion when applied between a paper substrate and a polyethylene coated (hydrophobic) paper substrate.

Adherents

Kraft; 85 g/m². Cut into a strip with dimensions: 250×30 mm.

PE coated Kraft; 90 g/m². A PE layer of 20 g/m² on top of a Kraft layer of 70 g./m². The surface tension of the PE surface is adjusted to approximately 40 mN/m by a Corona treatment (for a discussion of a Corona treatment, see e.g. D. Briggs and C. R. Kendall, "Chemical Basis of Adhesion to Electrical Discharge Treated Polyethylene", Polymer 20, 1053–1054, (1979), or R. Kruger and H. Potente, "Corona-Discharge Treatment of Polypropylene Films—Effects of Process Parameters", J. Adhesion, 11, 113–124, (1980)). Cut into a strip with dimensions: 250×40 mm.

Dry Solids

The concentration of an adhesive composition is determined by means of a refractometer (Atago AX-1000; 20° C.), and presented as a brix value.

Viscosity

The viscosity of a adhesive composition is determined by means of a viscometer (Brookfield RVF; 20 rpm, reading after 5 turns).

Practical Adhesion

The practical adhesion is determined in a T-peel test, using a universal testing machine (Zwick 1446; load cell 100 N). The test is performed in a conditioning room capable of maintaining a relative humidity of 50%±2% at 23±1° C. The adherents are stored under the same conditions. A adhesive composition is tested 16–24 hours from the moment of preparation. A thin film (60 μm) of an adhesive composition is applied on the Kraft strip (sieve side) by means of a wire winded rot. Immediately the glued paper is placed on the PE coated side of the other adherent, and pressed between two plates and pressed with 5 kg for one minute. The remaining adhesive joint is clamped between specimen grips and pulled apart at different time intervals: 5, 10, 15, 20, 25, 30, 45, 60 minutes. The test path has a length of 50 mm, the speed is set at 400 mm/min. The practical adhesion is represented by the force of resistance observed in the T-peel test. Fiber tear is clearly observed at a resistance force of 2500 mN/mm. This level is used as an arbitrary value to discriminate between the setting time of different adhesive compositions.

Performance

The performance of the adhesive composition in terms of viscosity and practical adhesion are summarized in Table 5.

TABLE 5

Viscosity and setting time of octenylsuccinic esters of hypochlorite oxidized amylopectin potato starch

| Dsmax | Concentration (Brix %) | Viscosity (mPa · s) | Setting time at 2500 mN/mm (minute) |
|---|---|---|---|
| 0.00 | 21.0 | 860 | 47 |
| 0.02 | 20.6 | 1100 | 23 |

From the results, it can be concluded that a decrease of the setting time and thus an improved adhesion is obtained when the amylopectin starch is hydrophobized.

Example 7

Emulsifying Properties

Emulsions of the oil-in-water (O/W) type were prepared.

The products were prepared as described in example 1 and 3. These products were drumdried as suspension to make them cold-water soluble. Solutions of these products were prepared in demineralized water in a concentration of 2 weight %. To 180 g of a stirred solution 20 g of paraffin oil (Merck p.a.) was added. The stirring was continued for 1 minute and then the emulsion was homogenized for 2 minutes with an Ultra Turrax T25 high shear mixer. The emulsion was allowed to stand overnight at 40° C. The results are summarized in Table 6.

TABLE 6

Emulsifying properties of hydrophobized starches.

| Starch type | Substituent | DSmax | Emulsion Stability after 24 hours |
|---|---|---|---|
| Amylopectin potato | none | none | free oil, unstable |
| | octenylsuccinic ester | 0.03 | Stable |
| | hydroxypropyldimethyl-ammoniumlauryl ether | 0.08 | Stable |
| Potato | hydroxypropyldimethyl-ammoniumlauryl ether | 0.08 | Creaming, unstable |

In the table can be seen that only hydrophobic amylopectin potato starch derivatives give stable emulsions.

Example 8

Thickening Behavior of Hydrophobic Modified Amylopectine Potato Starch as a Result of the Addition of Sodium Chloride The hydroxypropyltrimethylammonium ether (DSmax 0.125) of amylopectine potato starch is prepared in suspension with 3-chloro-2-hydroxypropyltrimethylammonium chloride as described in example 3. A 39 wt %. suspension was drum dried. The combined hydroxypropyldimethylammoniumlauryl and hydroxypropyltrimethylammonium ether of amylopectine potato starch is prepared in an one-pot suspension reaction with 3-chloro-2-hydroxypropyldimethylammoniumlauryl chloride (DSmax 0.04) and 3-chloro-2-hydroxypropyltrimethylammonium chloride (DSmax 0.06) as described in example 3. A 39 wt %. suspension of the derivative was drum dried. The hydroxypropyl, hydroxypropyldimethylammoniumlauryl double ether is prepared by first a reaction of amylopectin potato starch in suspension with 3-chloro-2-hydroxypropyldimethylammoniumlauryl chloride (DSmax 0.08) as described in example 3. Subsequently, a reaction in solution in an autoclave with propylene oxide (DSmax 0.5) was carried out to hydroxypropylate the derivative according to known procedures. The product was drumdrying.

Solutions of these products were prepared in demineralized water in a concentration of 10 weight %. To these solutions sodium chloride was added in different concentrations. After addition of salt the solutions were stirred for 30 minutes before the Brookfield viscosity was measured. The results are summarized in Table 7.

TABLE 7

Viscosity of hydrophobized amylopectin potato starch in the presence of sodium chloride

| Substituent | Dsmax | NaCl (weight %) | Viscosity (mPa · s) |
|---|---|---|---|
| none | none | 0.0 | 2120 |
| | | 1.0 | 2000 |
| | | 5.0 | 2025 |
| | | 10 | 2100 |
| hydroxypropyltri-methylammonium ether | 0.125 | 0.0 | 1100 |
| | | 5.0 | 975 |
| | | 10 | 1025 |
| hydroxypropyldi-methylammoniumlauryl ether and hydroxypropyl-trimethylammonium ether | 0.04 and 0.06 | 0.0 | 16800 |
| | | 1.0 | 28000 |
| | | 5.0 | 30000 |
| | | 10 | 53000 |
| hydroxypropyldi-methylammoniumlauryl ether and hydroxypropyl ether | 0.08 and 0.5 | 0.0 | 47000 |
| | | 1.0 | 122600 |
| | | 5.0 | 100600 |
| | | 10 | 84000 |

From the results, it can be concluded that the hydrophobic amylopectin potato starch shows an increase of the viscosity due to the addition of sodium chloride. Thus, the hydrophobic starch shows associate behavior.

Example 9

Noodle Seasoning Paste

Noodle seasoning paste samples with were prepared according to the recipe as shown in table 8. The octenylsuccinic esters of potato and amylopectin potato starch with both a DSmax of 0.03 were prepared according to the procedure as described in example 1.

As can be seen in Table 8, the hydrophobic interaction of the octenylsuccinic ester of amylopectin potato starch is higher than the interaction of the same derivative of potato starch. This results in a much lower dosage of the amylopectin potato starch derivative in the recipe.

TABLE 8

Stability of recipes of noodle seasoning paste.

| Recipe (weight %) | control | octenylsuccinic ester of potato starch | octenylsuccinic ester of amylopectin potato starch |
|---|---|---|---|
| Starch | none | 4.8% | 3.5% |
| Water | 9.2% | 8.7% | 8.8% |
| Dark soy sauce | 9.2% | 8.7% | 8.8% |
| Spices | 31.2% | 29.8% | 30.2% |
| Oil | 50.4% | 48.9% | 48.7% |
| Paste stability | Oil separation | Stable | Stable |

Example 10

Thickening of Starch Solutions with Hydrophobic Starch

A cationic amylopectin potato starch derivative (hydroxypropyltrimethylatnmonium chloride; DS=0.027) was dissolved in demineralized water in 1.0 weight %. This solution was mixed with a 1.0 weight % solution of a lauryl cationic starch ether (DS=0.088), prepared according to example 3.

The mixed solutions (1.0 weight %) were heated to 90° C. and cooled to room temperature. The Brookfield viscosities are summarized in Table 9.

TABLE 9

Brookfield viscosities (spindle Helipath) of mixtures of hydrophobic starch and cationic starch.

| Fraction of lauryl cationic starch (%) | Fraction of cationic starch (%) | Brookfield viscosity (mPa · s.) |
|---|---|---|
| 0.0 | 100.0 | <100 |
| 25.0 | 75.0 | 10600 |
| 50.0 | 50.0 | 10400 |
| 75.0 | 25.0 | 4000 |
| 100.0 | 0.0 | 200 |

As can be seen in Table 9, a remarkable increase of the viscosity is found when a solution of starch (derivative) is mixed with a solution of a hydrophobized amylopectin potato starch.

The invention claimed is:

1. A process for preparing a reversible gel comprising
   attaching a hydrophobic substituent to a starch by a reaction selected from the group consisting of etherification, esterification and amidation,
   wherein the starch is a root or tuber starch, or derivative thereof, comprising at least 95 wt. % of amylopectin based on dry substance of the starch;
   wherein said starch is from a plant having elimination or inhibition of genes that encode granule based starch synthase; and
   wherein the reaction utilizes a hydrophobic reagent comprising a reactive group and an alkyl group having 7–24 carbon atoms, and
   wherein the reactive group is a halide, halohydrin, epoxide, glycidyl or quaternary ammonium.

2. The process according to claim 1, wherein the hydrophobic reagent utilized during said etherification is selected from the group consisting of halide, halohydrin, epoxide, glycidyl, carboxylic acid and quarternary ammonium group.

3. The process according to claim 1, wherein the hydrophobic reagent utilized during esterification comprises an anhydride group.

4. The process according to claim 1, wherein the starch is a carboxymethylated starch and wherein the hydrophobic reagent utilized during said amidation comprises an amine group.

5. The process according to claim 1 further comprising attaching the hydrophobic substituent to the starch in the presence of a surfactant.

6. The process according to claim 1, wherein the derivative of the starch is obtained by hydroxyalkylation, carboxymethylation, cationization, partial degradation, oxidation, or a combination thereof.

7. A reversible gel obtained by the process of claim 1.

8. A method for increasing the associative behavior of a starch solution said method comprises adding a hydrophobized amylopectin starch to said starch solution, wherein the amylopectin starch is a root or tuber starch, or a derivative thereof, comprising at least 95 wt %. of amylopectin based on dry substance of the starch.

9. A method according to claim 8, wherein the amylopectin starch is hydrophobized by etherification or esterification.

10. A method according to claim 8, wherein the amylopectin starch is hydrophobized in the presence of a surfactant.

* * * * *

UNITED STATES PATENT AND TRADEMARK OFFICE
CERTIFICATE OF CORRECTION

PATENT NO. : 7,157,573 B2  Page 1 of 1
APPLICATION NO. : 11/205721
DATED : January 2, 2007
INVENTOR(S) : Buwalda et al.

It is certified that error appears in the above-identified patent and that said Letters Patent is hereby corrected as shown below:

IN THE SPECIFICATION:

Column 1, line 18    Now reads: "such as pclysaccharides"

Should read: -- such as polysaccharides --

Column 2, line 21    Now reads: "surf_ace"

Should read: -- surface --

Column 7, line 13    Now reads: "10 wt._,"

Should read: -- 10 wt. % --

IN THE CLAIMS:

Column 14, line 67 Claim 2    Now reads: "quartemary"

Should read: -- quarternary --

Signed and Sealed this

Fifth Day of February, 2008

JON W. DUDAS
*Director of the United States Patent and Trademark Office*